(12) United States Patent
Bornemann

(10) Patent No.: US 8,729,422 B2
(45) Date of Patent: May 20, 2014

(54) INTEGRATED CONSUMABLE STORAGE SPACE WITHIN A PLASMA CUTTING SYSTEM

(75) Inventor: Brian James Bornemann, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 628 days.

(21) Appl. No.: 12/426,019

(22) Filed: Apr. 17, 2009

(65) Prior Publication Data

US 2009/0277882 A1 Nov. 12, 2009

Related U.S. Application Data

(60) Provisional application No. 61/052,056, filed on May 9, 2008.

(51) Int. Cl.
*B23K 9/32* (2006.01)
(52) U.S. Cl.
USPC .................. 219/121.39; 219/133; 219/136

(58) Field of Classification Search
USPC .............. 219/121.39, 130.1, 130.5, 133, 136, 219/137 PS; 29/592.1
See application file for complete search history.

(56) References Cited

U.S. PATENT DOCUMENTS 6,396,019 B1 * 5/2002 Williams ...................... 219/136
6,707,000 B2 3/2004 Schneider et al.

* cited by examiner

*Primary Examiner* — Brian Jennison
(74) *Attorney, Agent, or Firm* — Fletcher Yoder P.C.

(57) ABSTRACT

Methods and systems for housing a consumable storage bin in addition to structural, thermal management, pneumatic, and/or electronic system components in a single multifunctional component within a plasma cutting power supply are provided. One embodiment of the present disclosure relates to a consumable storage bin, which fits into a consumable storage area in the power supply unit and is accessible to a user. In one embodiment, the consumable storage bin may be eliminated, leaving only the consumable storage area in which racks, snaps, friction-fit retention features, and so forth, may be placed to hold the consumables and ensure easy user access.

12 Claims, 8 Drawing Sheets

INTEGRATED CONSUMABLE STORAGE SPACE WITHIN A PLASMA CUTTING SYSTEM

CROSS REFERENCE TO RELATED APPLICATIONS

This application is a U.S. Non-provisional Patent Application of U.S. Provisional Patent Application No. 61/052,056, entitled "Integrated Consumable Storage Space within a Plasma Cutting System", filed May 9, 2008, which is herein incorporated by reference.

BACKGROUND

The present disclosure relates generally to metal cutting systems, and more particularly, to systems and methods for storage of plasma cutting consumables and spare parts.

A plasma cutting system harnesses the energy in plasma (e.g., high temperature ionized gas) to cut metal or other electrically conductive material. A plasma arc must be struck between components in the plasma cutting torch and the workpiece. Accordingly, typical plasma cutting systems are configured with a torch and a work lead attached to a power supply unit, which houses multiple structural, thermal management, pneumatic and electronic components central to a plasma cutting operation.

The cutting operation of a plasma cutting system typically utilizes multiple types of consumable materials and spare parts, such as tips, electrodes, goggles, nozzles, swirl rings, drag shields, insulating cups, retaining cups, and so forth. Accordingly, system operators often utilize a storage box or container for holding consumables or spare parts. Typical consumable and spare part containers are independent from other internal components of plasma cutting systems. Indeed, consumable and spare part containers are traditionally manufactured separately from the plasma cutting power supply unit and its associated internal components. Since the storage container is an independent component, its housing typically serves the sole purpose of holding consumables and spare parts.

BRIEF DESCRIPTION

The present disclosure is directed to systems and methods relating to a consumable and spare parts storage bin for a plasma cutting system. One embodiment of the present disclosure relates to a consumable storage bin that is integral with a multifunctional component of a power supply and that fits into a consumable storage area in the power supply unit such that it is accessible to a user. The bin may be closed and opened by moving at least a portion of the bin relative to the storage area. In particular, the present disclosure provides methods and systems for housing a consumable storage bin in addition to structural, thermal management, pneumatic and/or electronic system components in a single multifunctional component. In one embodiment, the consumable storage bin may be eliminated, leaving only the consumable storage area in which racks, snaps, friction-fit retention features, and so forth, may be placed to hold the consumables and ensure easy user access.

DRAWINGS

These and other features, aspects, and advantages of the present disclosure will become better understood when the following detailed description is read with reference to the accompanying drawings in which like characters represent like parts throughout the drawings, wherein.

Figure 7:
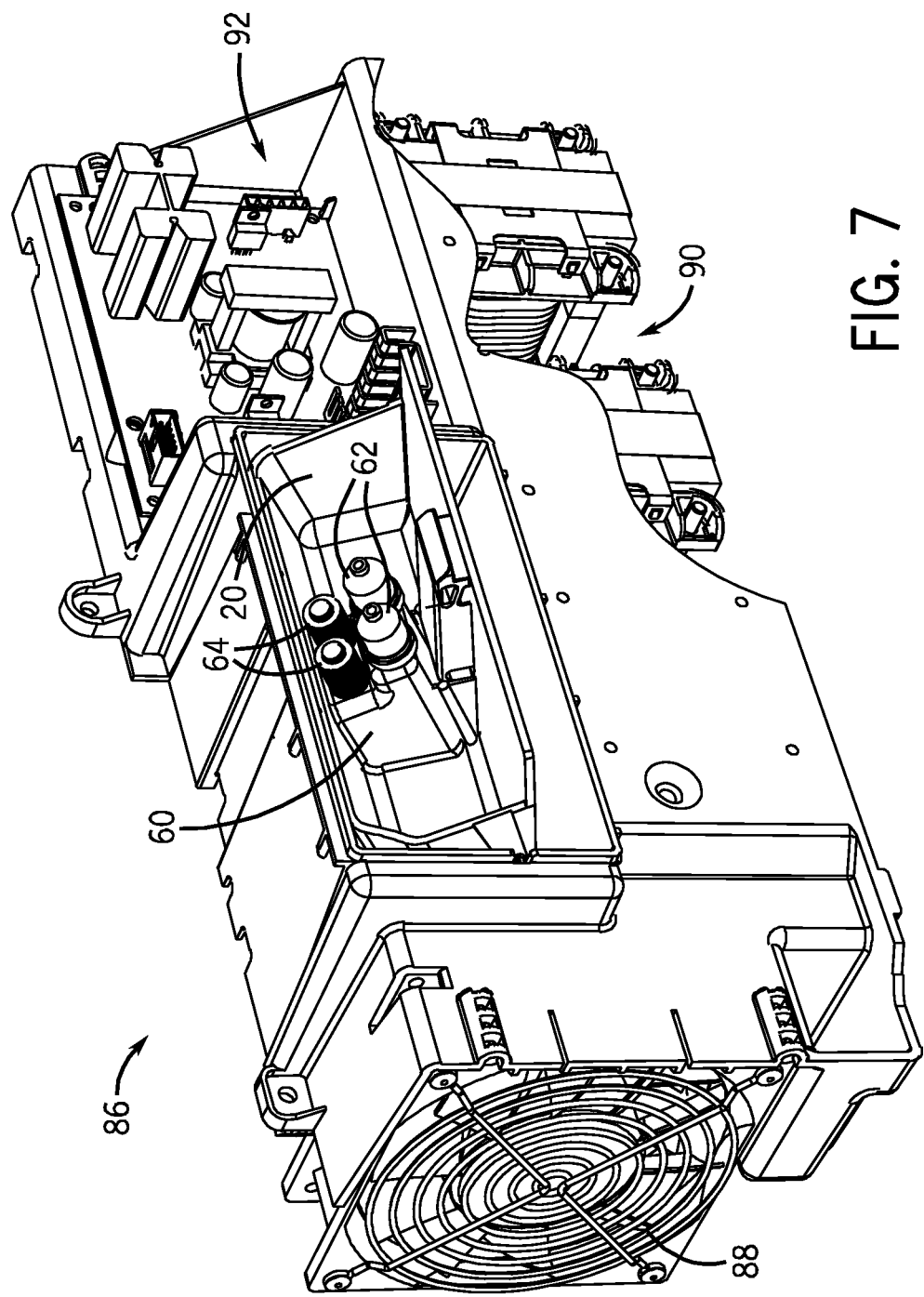
Figure 8:
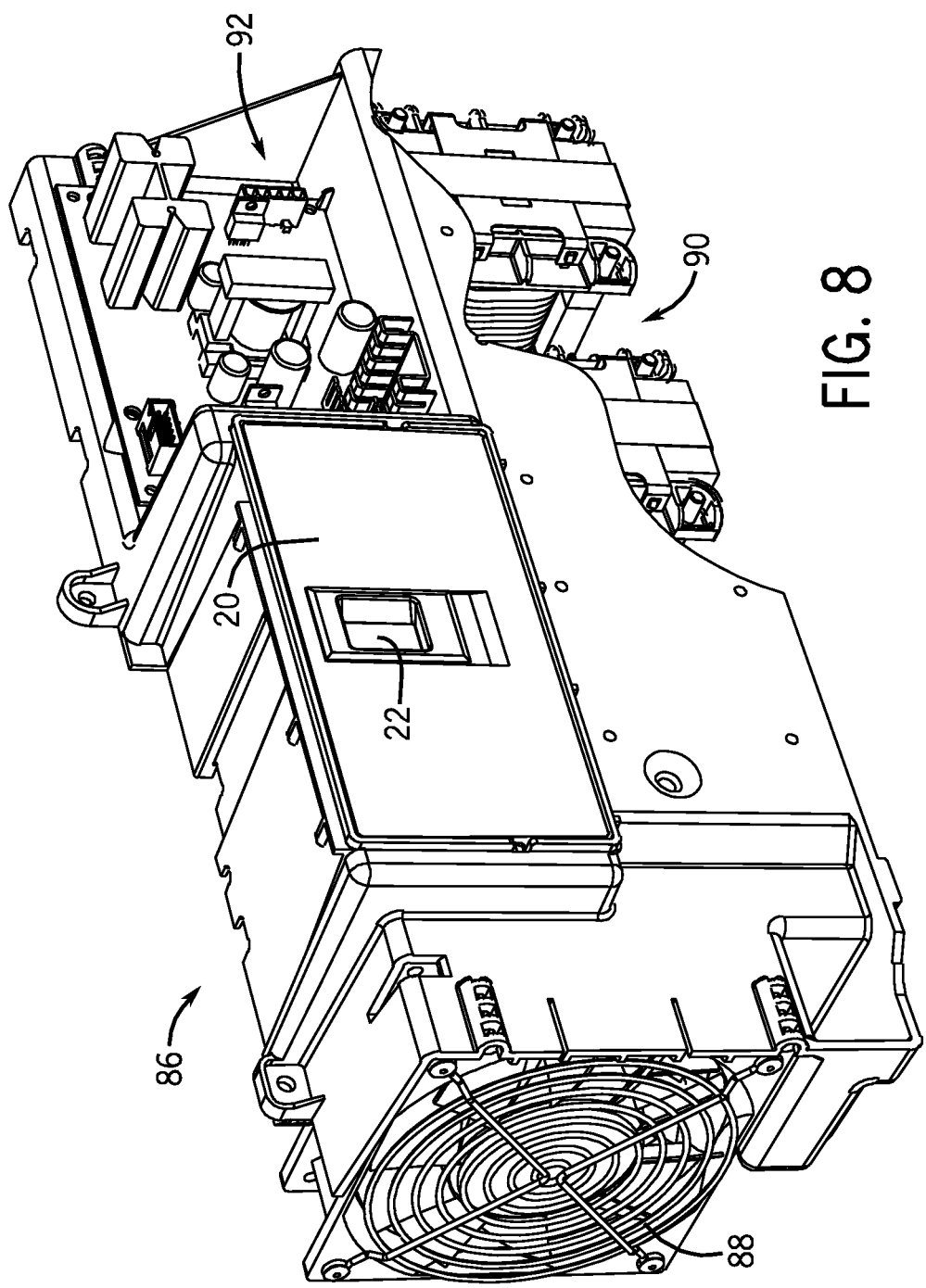

FIG. 7 illustrates a perspective view of a multifunctional component that houses a consumable storage bin, which is shown in an open configuration, along with structural, thermal management, and electronic system components in accordance with aspects of the present disclosure; and FIG. 8 illustrates a perspective view of a multifunctional component that houses a closed consumable storage bin along with structural, thermal management, and electronic system components in accordance with aspects of the present disclosure.

DETAILED DESCRIPTION

Consumable storage containers and the like for plasma cutting systems have traditionally been provided separately from the internal components of the plasma cutting system. It is now recognized that, as a separate single-function component, a storage container adds manufacturing complexity and monetary cost to supplement a plasma cutting system. Accordingly, it is now recognized that it is desirable and more efficient to provide plasma cutting systems with storage containers that are integrated into the plasma cutting systems by incorporating the storage containers into preexisting components. Thus, embodiments in accordance with present disclosure are directed to storage areas and/or storage bins that are integral with internal components of the plasma cutting systems. The storage areas and/or storage bins may cooperate with internal components of the plasma cutting systems to facilitate cutting operations. It should be noted that the internal components may include structural, thermal management, pneumatic, and/or electronic components.

Figure 1:
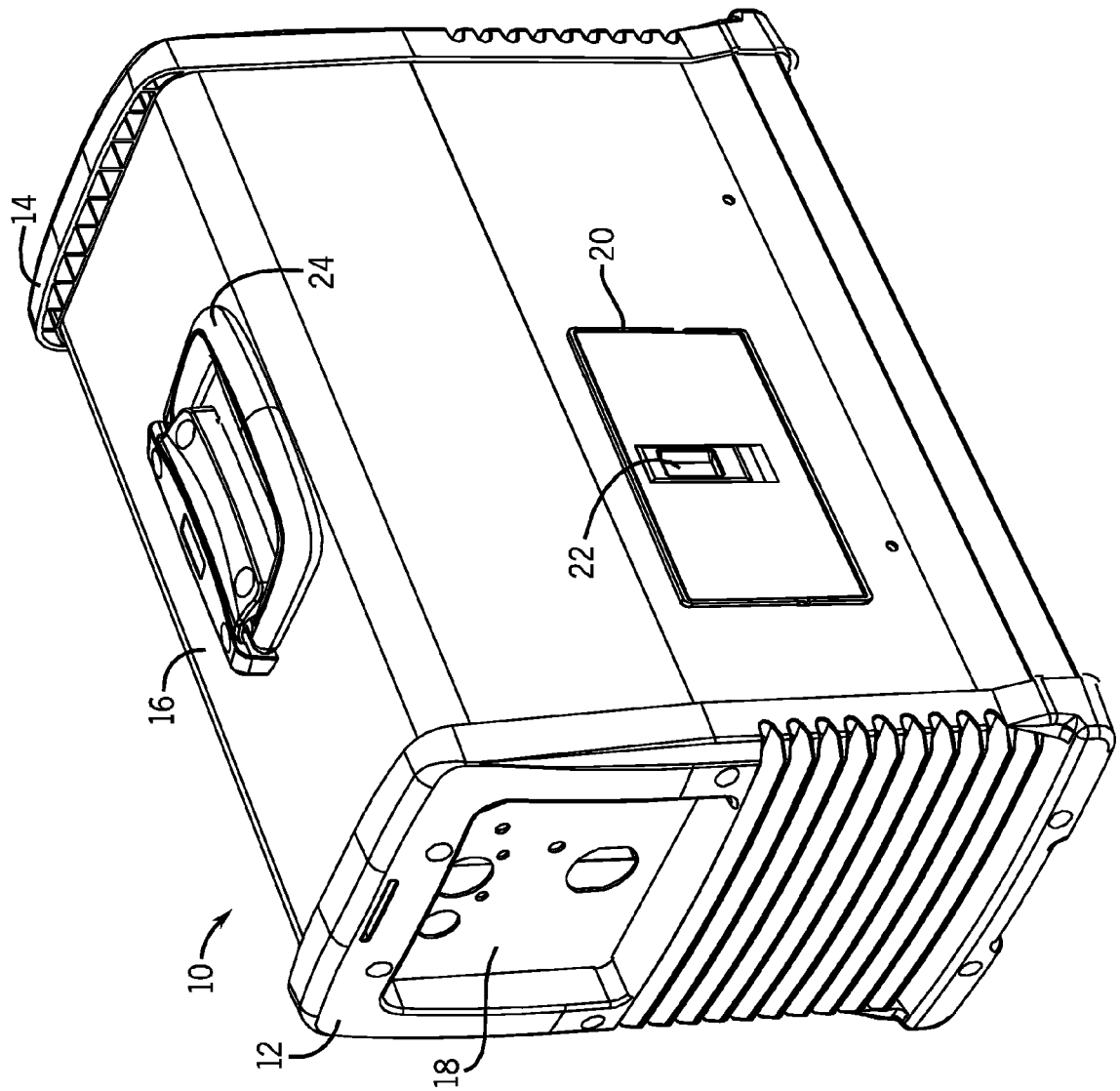
FIG. 1 illustrates a perspective view of an exemplary plasma cutting power supply with a closed integrated consumable storage bin in accordance with aspects of the present disclosure.

FIG. 1 illustrates an exemplary plasma cutting power supply 10, which functions to power, control, and provide consumables to a cutting operation in accordance with aspects of the present disclosure. The power supply 10 contains a back panel 12 and a front panel 14, which cooperate with a body 16 to form a housing of the plasma cutting power supply 10. The power supply 10 may include features that are configured to communicatively couple the power supply 10 to other system components, such as a torch, a work lead, a wall power outlet, and so forth. For example, the front panel 14 may include ports and connectors that facilitate attachment of an external component (e.g., a torch) to internal components of the plasma cutting power supply 10, thus facilitating supply of consumables to the external component. Similarly, the back panel 12 may include a port that is configured to attach to a primary power supply cable to facilitate transmission of electricity from a primary power supply (e.g., a wall outlet) to the power supply 10. The port may be mounted on a panel 18 that provides an interface between the power supply 10 and components used in the cutting operation. Further, the power supply 10 may include control features that enable a user to adjust the operation of the power supply 10. For example, the front panel 14 of the power supply 10 may contain a control panel through which a user may control the supply of materials, such as power, gas flow, and so forth, to the cutting operation.

In the illustrated embodiment, the body 16 of the power supply 10 contains an integrated consumable storage bin 20 with a bin handle 22. By including the consumable storage bin 20 as an integral part of the power supply 10, present embodiments may provide the functionality previously provided by auxiliary storage systems all within the power supply 10. The consumable storage bin 20 extends into the power supply 10 and coordinates with other functional components of the power supply 10 that are not shown in the illustrated embodiment. For example, in one embodiment, a portion of the storage bin 20 may form a wall of a cooling airflow passage. Indeed, it should be noted that, as described in further detail below, the present disclosure provides a single internal multifunctional component that houses the consumable storage bin 20 in addition to housing structural, thermal management (e.g. fans), and electronic system components. It should be noted that in other embodiments, pneumatic components, such as valves, regulators, filters, and so forth, may also be housed in or on the multifunctional component.

The consumable storage bin 20 may be opened by a user by pulling the bin handle 22. For example, a user may open the storage bin 20 to access stored consumables such as tips, electrodes, goggles, nozzles, swirl rings, drag shields, insulating cups, retaining cups, and so forth that may be positioned within the internal portion of the storage bin. While the illustrated embodiment includes the bin handle 22, which allows a user to pull the storage bin 20 to facilitate access, in other embodiments, different accessibility features may be utilized to facilitate access to the internal portion of the storage bin 20. For example, a sliding door, a spring-activated door, and so forth may be utilized in accordance with present embodiments. It should be noted that portability of the power supply 10 may be facilitated by inclusion of a system handle 24, which enables the user to easily grasp the power supply 10 and move the power supply 10 to the location of a workpiece.

Figure 2:
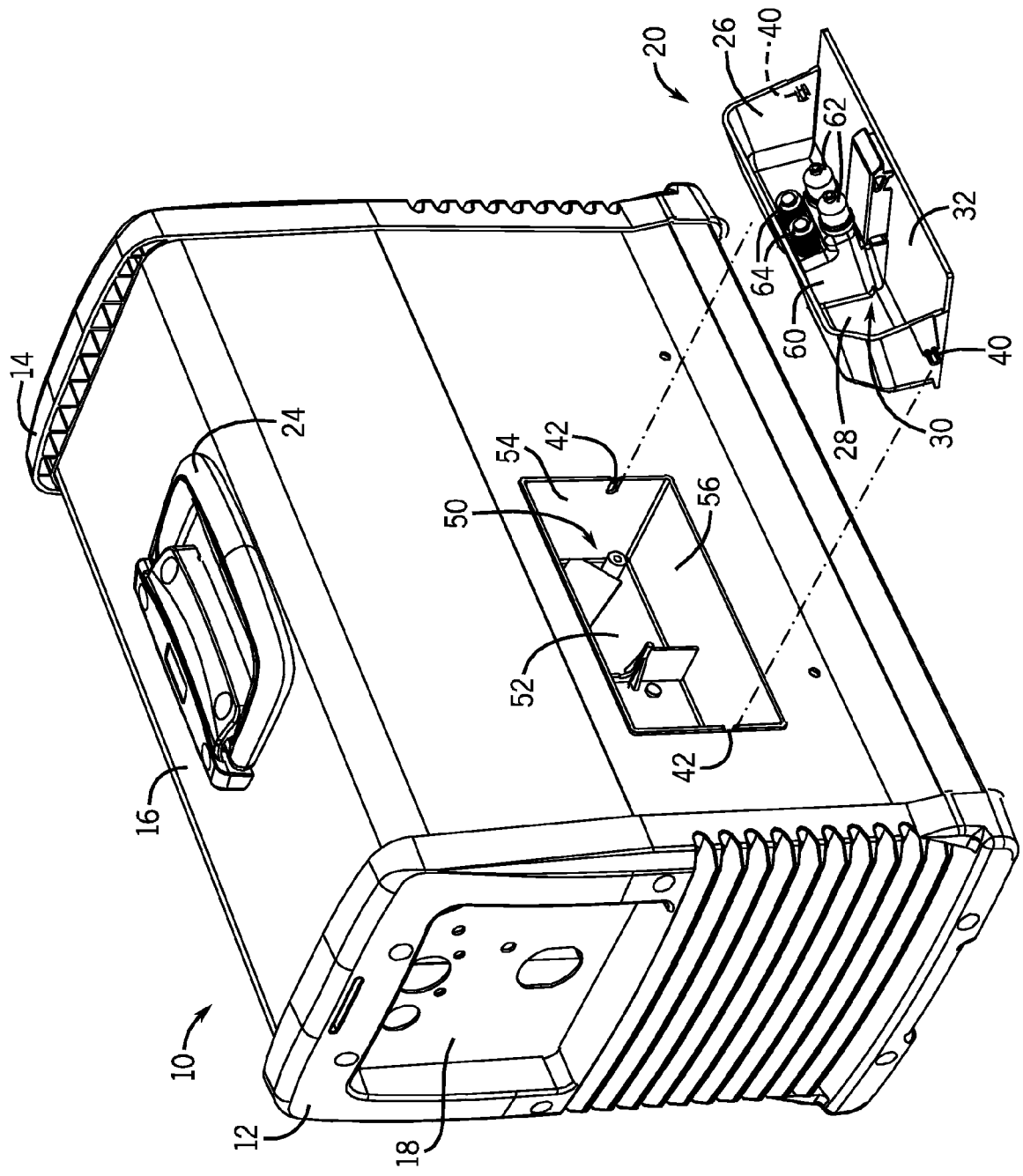
FIG. 2 illustrates a perspective view of an exemplary plasma cutting power supply with an open integrated consumable storage bin in accordance with aspects of the present disclosure.

FIG. 2 illustrates one embodiment of the power supply 10 with the integrated consumable storage bin 20 removed from the power supply 10. It should be noted that the illustrated embodiment provides the single multifunctional component that houses the consumable storage bin 20 in addition to structural, thermal management, pneumatic, and electronic system components as described in more detail below. In the embodiment shown, the storage bin 20 includes a set of walls 26 and a base 28 that cooperate to form a cavity or internal portion 30 that facilitates storage of consumables. This cavity may be integral with or conformal with an integral multifunctional component within the power supply 10. An outer wall 32 of the storage bin 20, which is positioned toward the outside of the power supply 10 when the storage bin 20 is in a closed configuration, may be shaped to generally conform to corresponding features of the body 16 and may include the bin handle 22. A pair of tabs 40 extends horizontally from the walls 26 on the left and right of the outer wall 32. The tabs 40 are configured to fit into apertures 42 in a consumable storage area 50 of the power supply 10. In the illustrated embodiment, the consumable storage area 50 includes a substantially rectangular recess in the power supply unit 10 that is sized to receive the storage bin 20 and facilitate movement of the storage bin 20 within the storage area 50. Further, the storage area 50 includes a back divider 52, border walls 54 and a border base 56 that isolate the storage bin 20 from internal components of the power supply 10. In other embodiments, the storage area 50 and the storage bin 20 may be shaped differently. Further, in some embodiments, the storage area 50 may not include a boundary, such as the back divider 52. For example, a wall of the storage bin (e.g., walls 26) may serve as a boundary between the contents of the storage bin 20 and the internal features of the power supply 10. In further embodiments, the back divider may include an attachment that is removably secured to the bin 20.

The tabs 40 may be positioned within the apertures 42 to allow the bin 20 to be opened and closed while remaining fastened to the power supply unit 10. In other words, the tabs 40 and the apertures 42 may cooperate such that the storage bin 20 can be rotated relative to the storage area 50 about an axis between the tabs 40 into a closed position and an open position by pushing and pulling the bin handle 22. In the illustrated embodiment, the storage bin 20 is configured to rotate about a horizontal axis. However, in other embodiments, the tabs 40 and apertures 42 may be positioned such that they form a vertical axis on a far left or right side of the storage bin 20, which may enable a user to open and/or close the storage bin by rotating it about a vertical axis. Further, in other embodiments, different apparatuses, such as hooks, screws, and so forth, for securing the bin 20 in the storage area 30 may be used in place of the tabs 40. For example, in one embodiment, the storage bin 20 may slide into and out of the storage area 30 along rails, like a drawer.

As is shown in the illustrated embodiment, the storage bin 20 may contain a rack 60 that is configured to hold electrodes 62, tips 64, and so forth. For example, the rack 60 may include features that are arranged and sized to hold specific consumables and other features (e.g., goggles). As a specific example, the rack 60 may include a feature that is specifically sized and positioned to hold the pair of electrodes 62 and the pair of tips 64. Additionally, the rack 60 may contain hooks for hanging identification tags or posts for storing identification tags. The rack 60 may be attachable or integral with the boundaries of the storage bin 20. In other embodiments, the storage bin 20 may contain a plurality of racks configured to fit and hold the desired consumables and/or other features previously mentioned.

Figure 3:
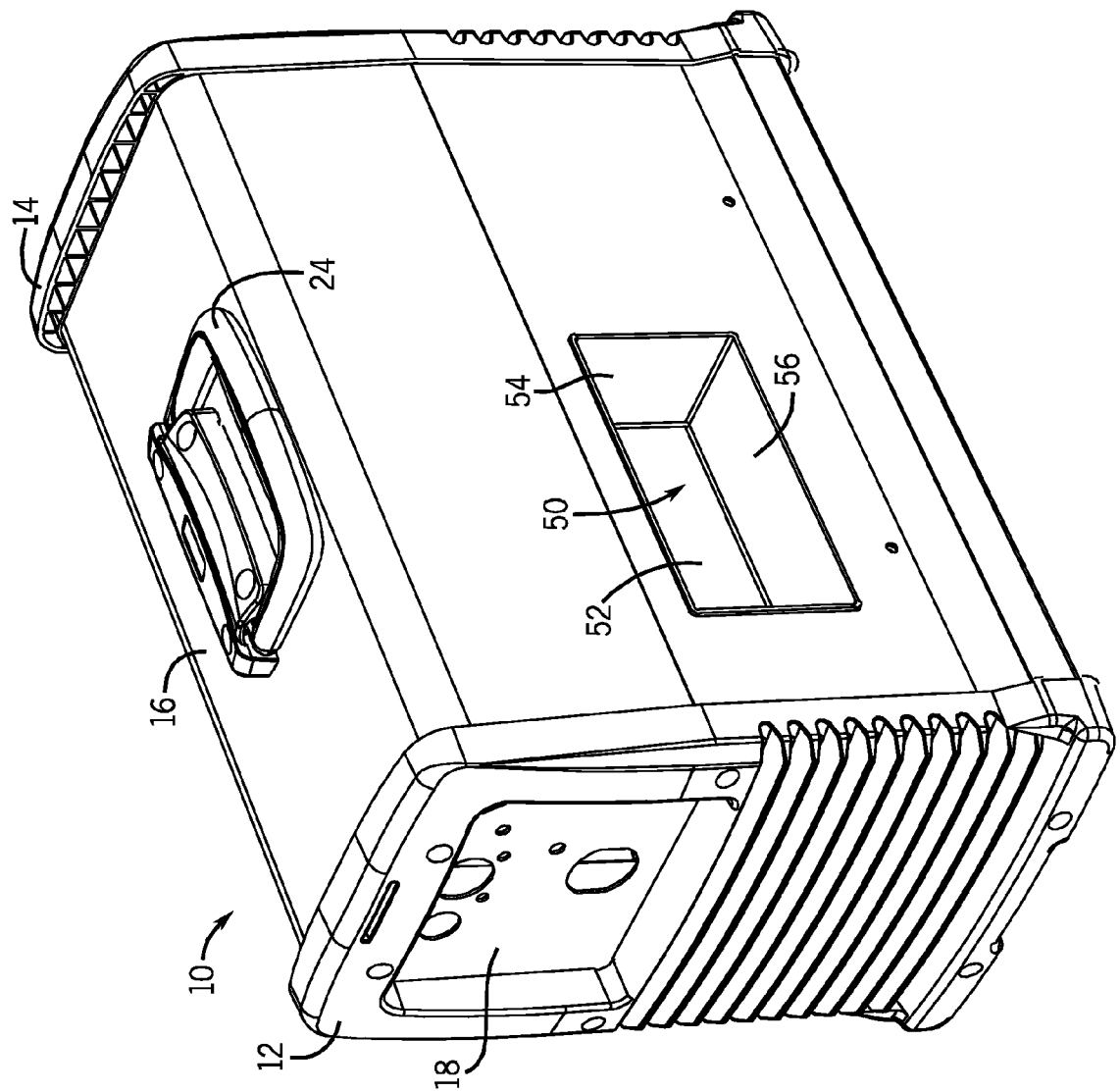
FIG. 3 illustrates a perspective view of an exemplary plasma cutting power supply with a recess that forms a consumable storage area in accordance with aspects of the present disclosure.
Figure 4:
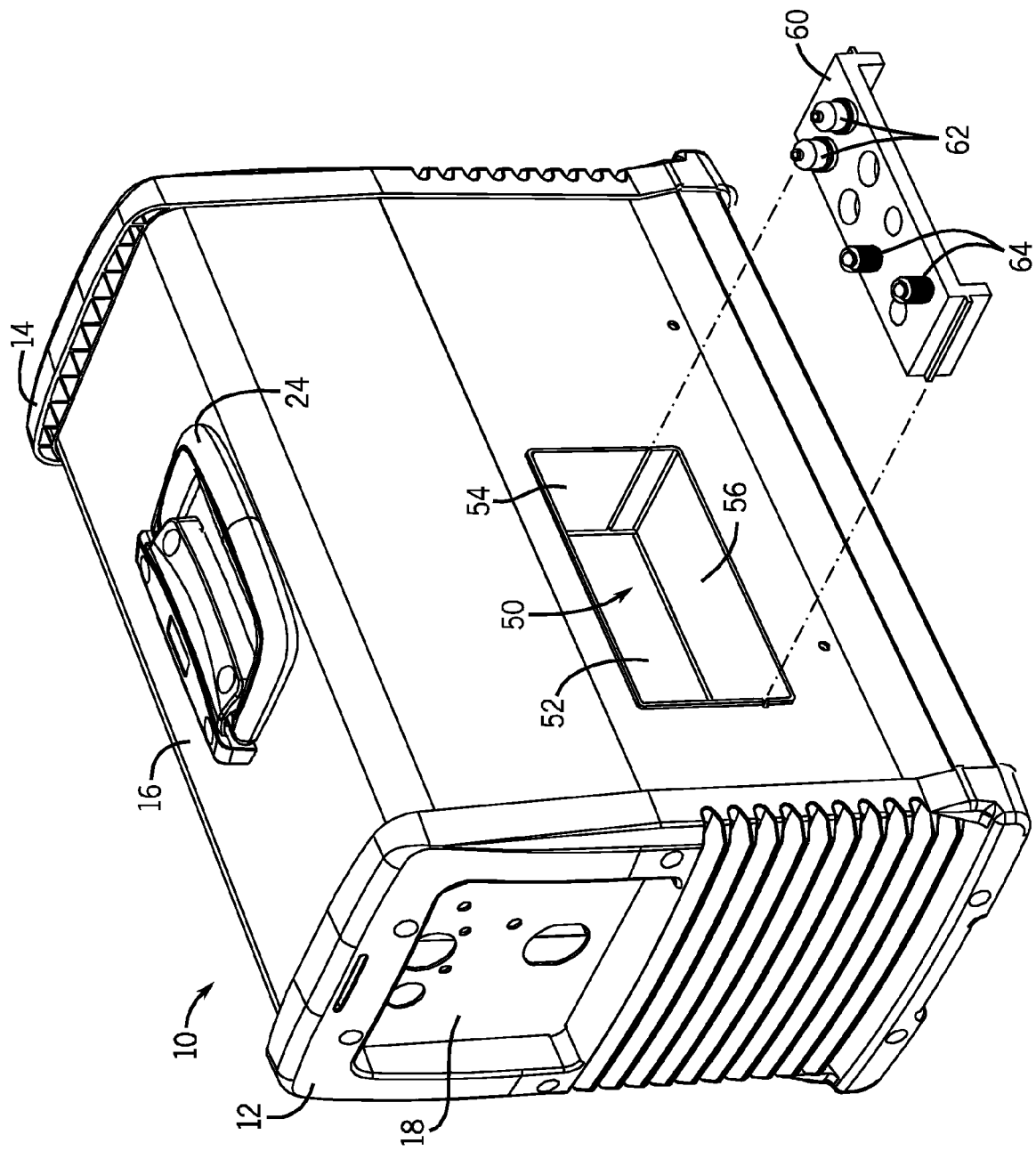
FIG. 4 illustrates a perspective view of an exemplary plasma cutting power supply with a rack in a recess that forms a consumable storage area in accordance with aspects of the present disclosure.

In one embodiment, as illustrated in FIG. 3, the storage bin 20 may not be included, leaving only the consumable storage area 50, which is provided in the single multifunctional component that houses the storage area 50 in addition to structural, thermal management, pneumatic and electronic system components as described in more detail below. In this embodiment, consumables, such as electrodes 62, tips 64, and so forth may be placed directly into the consumable storage area 50 and easily accessed by the user. In one embodiment, the base 56 of the consumable storage area 50 may protrude out from the power supply unit 10 such that a ledge, which may be used to support consumables, is formed. The ledge may fold down to facilitate compact storage of the power supply unit 10 when it is not in use. Additionally, the ledge may slide into the consumable storage area 50 when not in use. In a further embodiment, as illustrated in FIG. 4, racks 60 may be placed directly into the consumable storage area 50 to hold consumables and ensure easy user access. Consumables 62, 64 may be held by racks 60, snaps, friction-fit retention features, and so forth, that may be arranged in the consumable storage area 50. In some embodiments, the consumable storage area 50 may include an attachable or integral rack 60 for holding consumables, tools, or other features. In other embodiments, the consumable storage area 50 may include a permanently attached rack 60. The rack 60 may slide in and out of the consumable storage area 50 on tracks configured to prevent the rack 60 from dislodging when it is extended outward. Additionally, in one embodiment, the base 56 of the consumable storage area 50 may protrude out from the power supply unit 10 such that a ledge, which may be used to support the rack 60, is formed.

Figure 5:
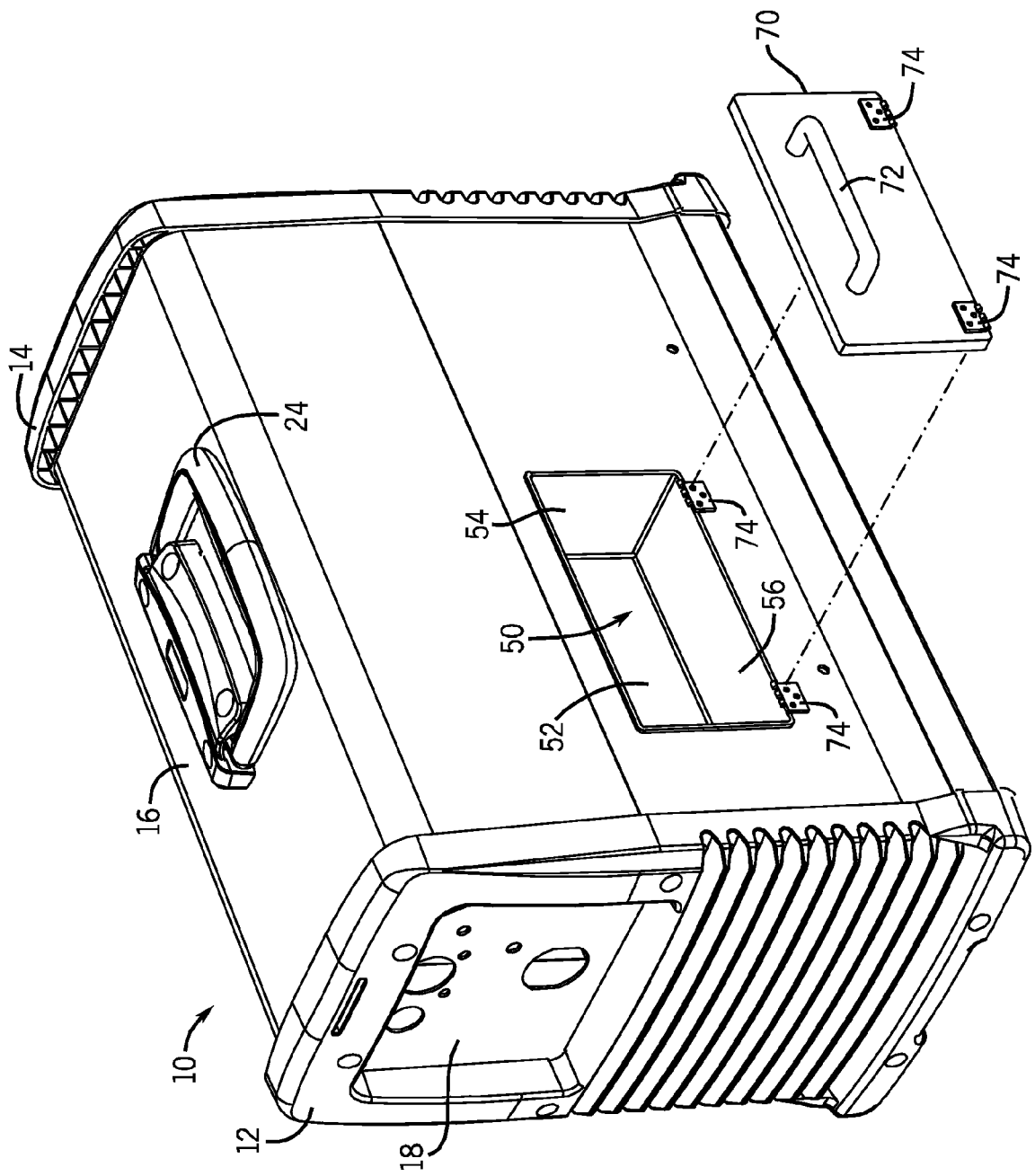
FIG. 5 illustrates a perspective view of an exemplary plasma cutting power supply with a door to a recess that forms a consumable storage area in accordance with aspects of the present disclosure.

FIG. 5 illustrates another embodiment of the present disclosure in which a door 70 with a handle 72 facilitates user access to the consumable storage area 50. In the illustrated embodiment, hinges 74 on the door 70 and the bottom of the consumable storage area 50 secure the door 70 to the power supply unit 10. In the illustrated embodiment, the door 70 folds downward to allow the user access to consumables. However, in other embodiments, the door 70 may open upward or to the left or right. Additionally, the door 70 may be configured to slide parallel to the side of the power supply unit 10 in either the up, down, left or right direction. The consumable storage area 50 may remain open or may be outfitted with racks, snaps, friction-fit retention features, and so forth, that may be arranged in the consumable storage area 50 to hold consumables and ensure easy user access. The door 70 may fold down to facilitate compact storage of the power supply unit 10 when it is not in use. Additionally, the door 70 may slide into the consumable storage area 50 when not in use to facilitate compact storage. It should be noted that the illustrated embodiment provides the storage area 50 in the single multifunctional component that also houses structural, thermal management, pneumatic and electronic system components as described in more detail below.

Figure 6:
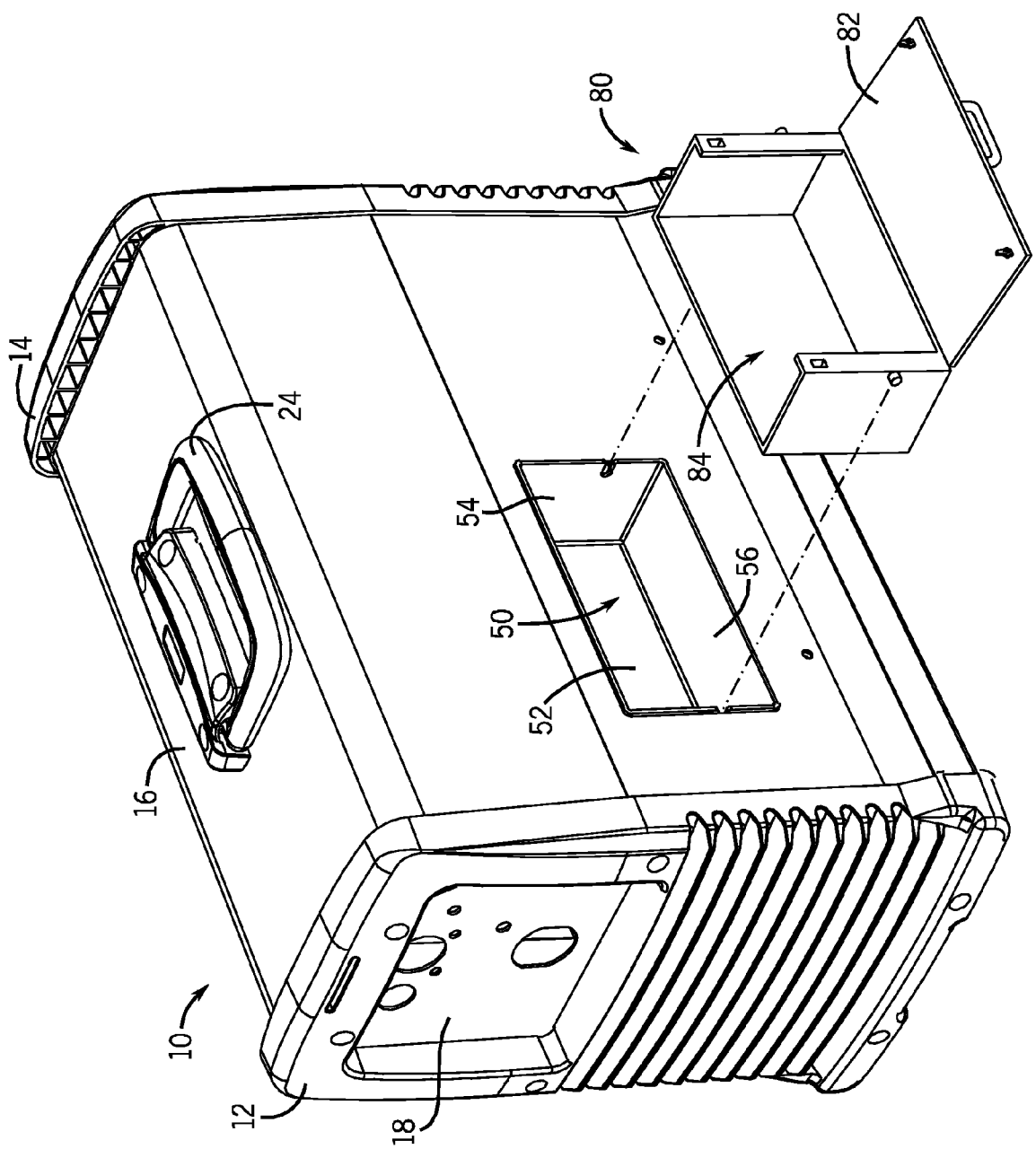
FIG. 6 illustrates a perspective view of an exemplary plasma cutting power supply with an open drawer in accordance with aspects of the present disclosure.

FIG. 6 illustrates another embodiment of the present disclosure in which a drawer 80 may fit into the consumable storage area 50, which is provided in the single multifunctional component along with structural, thermal management, pneumatic, and electronic system components, to hold consumables. In the illustrated embodiment, a door 82 of the drawer 80 may open such that the user may either open the door 82 to access the consumables or slide the drawer 80 out of the power supply unit 10 to access consumables. The drawer 80 contains a storage area 84 in which racks, snaps, friction-fit retention features, and so forth, may be arranged to hold consumables and ensure easy user access. In certain embodiments, the drawer 80 may slide on tracks that may facilitate drawer 80 entry and exit to and from the consumable storage area 50. In other embodiments, the drawer 80 may be directly placed into the consumable storage area 50 without tracks. In such embodiments, the drawer 80 may be easily removed by the user to fill the drawer 80 with consumables when it is not in use. Additionally, in such embodiments, drawers 80 may be easily transferred between power supply units 10 and between users.

FIG. 7 illustrates internal features of the power supply 10 in accordance with aspects of the present disclosure. In the embodiment illustrated by FIGS. 1 and 2, these internal features are surrounded by an outer shell of the unit 10. Internal components of the illustrated power supply unit 10 comprise structural, thermal management, and electronic features central to the cutting operation. The present disclosure provides a single multifunctional component 86, as illustrated in FIG. 7, which houses the consumable storage bin 20 in addition to structural, thermal management, and electronic system components. The multifunctional component 86 combines various features that cooperate as a single unit to serve functions that include creating a mounting surface for power magnetics and electrical circuit boards, creating a capture feature for cooling air, forming an airflow duct for passage of the cooling air, creating a barrier for debris, and forming a storage area that is accessible from outside of a system enclosure. It should be noted that in other embodiments, pneumatic components, such as valves, regulators, filters, and so forth, may also be housed in or on the multifunctional component 86.

In the illustrated embodiment of FIG. 7, the storage bin 20 is shown in an open configuration, which allows the user to access the consumables 62, 64 stored in the rack 60. The multifunctional component 86 also houses a fan 88, which cools components in the power supply 10. A wind tunnel 90 may be created within the multifunctional component 86, which forms an airflow duct. For example, the wind tunnel 90 may be formed by essentially aligning the boundaries of certain features along the length of the multifunctional component 86 for facilitating flow of cooling air from the fan 88. The wind tunnel 90 may be partially formed by an internal wall of the storage area 50 and/or the storage bin 20. In the illustrated embodiment, the multifunctional component 86 also provides a mounting surface for magnetic power components. Additionally, internal components of the multifunctional component 86, such as filters, may create a barrier for preventing dirt and debris drawn in by the fan 88 from making contact with other more sensitive internal components. Further, the multifunctional component 86 may also provide a mounting surface 92 for electrical circuit boards.

FIG. 8 illustrates the multifunctional component 86 with the storage bin 20 shown in a closed configuration with the bin handle 22 facing outward such that a user can readily access the bin handle 22, and, thus, pull the bin handle 22 to open the bin 20. In one embodiment, the multifunctional component 86 may be manufactured from plastic. In further embodiments, it may be manufactured from additional materials, such as metal. The multifunctional component 86 may be manufactured by a variety of processes, such as injection molding, compression molding, hydroforming, casting, forging, and so forth. By combining both the consumable storage bin 20 and the other system components 88, 90, 92 all on one multifunctional component 86, the multifunctional component 86 may serve purposes that are traditionally served by the use of auxiliary consumable storage boxes, which add to complexity of manufacturing and use. In one embodiment, the multifunctional component 86 may be manufactured such that the dividing wall 52 is a part of the multifunctional component 86. In another embodiment, the body 16 of the power supply 10 may be manufactured such that the dividing wall 52 is a part of the body 16. In further embodiments, the multifunctional component 86 and the body 16 may be manufactured such that there is no dividing wall 52. It should be noted that while the illustrated embodiments merely include a single storage area and/or storage bin, in some embodiments, the power supply unit 10 may include multiple storage areas and/or storage bins in accordance with aspects of the present disclosure.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A plasma cutting system, comprising:
a plasma cutting power supply unit comprising a housing;
a multifunctional internal component disposed within the housing and comprising an assembly of functional components surrounded by the housing such that the assembly of functional components is internal to the housing, wherein the assembly of functional components comprises thermal management, pneumatic, and/or electronic components capable of functioning to facilitate flow of heat, gas, and/or electrical current during performance of a plasma cutting operation, and wherein the functional components of the multifunctional internal component are disposed to provide a recess integral with the functional components; and
a storage compartment integral with the recess of the multifunctional internal component and configured to enable storage of supplies configured for use in a plasma cutting operation, wherein the housing comprises an opening for accessing the storage compartment.

2. The plasma cutting system of claim 1, wherein the storage compartment comprises a second recess disposed in the recess in the multifunctional internal component, wherein the second recess is accessible from outside of the plasma cutting power supply unit.

3. The plasma cutting system of claim 2, wherein the second recess includes a consumable storage rack.

4. The plasma cutting system of claim 3, wherein the consumable storage rack is integral with at least one boundary of the second recess.

5. The plasma cutting system of claim 1, wherein the storage compartment comprises a bin disposed in the recess in the multifunctional internal component.

6. The plasma cutting system of claim 5, wherein the bin is coupled to boundaries of the recess via a hinge mechanism that facilitates opening and closing the bin.

7. The plasma cutting system of claim 5, wherein the bin is coupled to boundaries of the recess via a sliding mechanism that facilitates opening and closing the bin.

8. The plasma cutting system of claim 5, wherein a rear wall of the storage compartment forms a boundary of an air cooling passage through the plasma cutting system.

9. The plasma cutting system of claim 1, wherein the supplies configured for use in the plasma cutting operation comprise tips, electrodes, goggles, nozzles, swirl rings, drag shields, insulating cups, retaining cups, or a combination thereof.

10. A plasma cutting power supply unit, comprising:
a housing;
a control panel disposed within the housing and configured to interface with an electrode with negative polarity and a work lead with positive polarity;
a multifunctional internal component disposed within the housing and comprising an assembly of functional components surrounded by the housing such that the assembly of functional components is internal to the housing, wherein the assembly of functional components comprises thermal management, pneumatic, and/or electronic components capable of functioning to facilitate flow of heat, gas, and/or electrical current during performance of a plasma cutting operation, wherein the functional components of the multifunctional internal component are disposed to provide a recess integral with the functional components;
a storage compartment integral with the recess of the multifunctional internal component and configured to enable storage of supplies configured for use in a plasma cutting operation; and
control circuitry configured to establish and maintain a plasma cutting arc between the electrode and a workpiece coupled with the work lead, wherein the housing comprises an opening for accessing the storage compartment.

11. The plasma cutting power supply of claim 10, wherein the storage compartment comprises a second recess in the multifunctional internal component that is accessible from outside of the power supply unit.

12. The plasma cutting system of claim 10, wherein the storage compartment comprises a bin disposed in the recess.

* * * * *